(12) United States Patent
Aldrich et al.

(10) Patent No.: US 7,228,548 B1
(45) Date of Patent: Jun. 5, 2007

(54) NINE LAYER ARCHITECTURE

(75) Inventors: Daniel J. Aldrich, Countryside, KS (US); Frank M. Waterman, Olathe, KS (US); Brian D. Haner, Ottawa, KS (US); Logan Wade, Liberty, MO (US); Regina H. O'Meara, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 793 days.

(21) Appl. No.: 10/017,850

(22) Filed: Nov. 30, 2001

(51) Int. Cl.
*G06F 3/00* (2006.01)

(52) U.S. Cl. .................................... 719/310
(58) Field of Classification Search ............... 719/310; 707/100
See application file for complete search history.

(56) References Cited

U.S. PATENT DOCUMENTS

| | | | |
|---|---|---|---|
| 5,181,171 A * | 1/1993 | McCormack et al. | 702/14 |
| 5,504,780 A * | 4/1996 | Alspector et al. | 375/230 |
| 5,793,368 A * | 8/1998 | Beer | 715/747 |
| 5,933,837 A * | 8/1999 | Kung | 707/201 |
| 6,353,819 B1 * | 3/2002 | Edwards et al. | 707/2 |
| 7,000,238 B2 * | 2/2006 | Nadler et al. | 719/330 |
| 2004/0100507 A1 * | 5/2004 | Hayner et al. | 345/855 |

OTHER PUBLICATIONS

Rick Whiting, CA Ship Database-Management Suite For E-Commerce, May 15, 2000.*

* cited by examiner

*Primary Examiner*—William Thomson
*Assistant Examiner*—LeChi Truong

(57) ABSTRACT

A province architecture includes a witness province, an action province, and a yoke province. The witness province may contain a collection layer, an envoy layer, and a naturalization layer configured to identify data and transmit data to and from multiple types of user interfaces. The action province may include a naturalization layer, a terminal layer, a unified global logic interpreter layer, a repository layer, an initiation layer, and an optimization layer are configured to process logic and generate formatted commands to and from user interfaces and persistent storage locations. The yoke province may include a nomadic layer configured to make connections to varied databases and generate commands to those databases for the transfer of data.

8 Claims, 3 Drawing Sheets

NINE LAYER ARCHITECTURE

RELATED APPLICATIONS

Not Applicable

FEDERALLY SPONSORED RESEARCH OR DEVELOPMENT

Not Applicable

MICROFICHE APPENDIX

Not Applicable

FIELD OF THE INVENTION

The present invention relates to the field of computer software architectures.

BACKGROUND OF THE INVENTION

Architectures generally refer to how a system is designed and how the components of a system operate with each other. Reference models for computer architectures typically identify various layers through which a communication or data will pass or in which computer software or hardware may operate. Additionally, reference models may identify how various computer software and hardware components undertake functions within a layer. Some reference models are known as protocols.

For example, the Open Systems Interconnection reference model (OSIRM) identifies seven layers. They are the application, presentation, session, transport, network, data link, and physical layers. The application layer supports user functions, such as file transfers and transaction processing. The presentation layer transfers syntaxes for character coding. The session layer coordinates services, dialogue, and synchronization. The transport layer coordinates communications for reliable end-to-end communication. The network layer delivers data within a sub-network and provides addressing and internetworking. The data link layer deals with data transmission between two points. The physical layer provides bit transmission over a physical connection.

Other layered models are referred to as N-tier models. N-tier models use separate layers to divide functionality of an architecture. In an N-tier model, data or a communication passes through each layer before getting to another layer for processing. Thus, in a three tier model, data must pass through the second layer to get from the first layer to the third layer. One such model may include a graphical user interface (GUI) layer, an application controller layer, a business function objects layer, a domain layer, and a persistence layer.

Current reference models are static and require compliant objects to relay communications, such as control messages, requests, and/or data, from one layer to another in spite of the fact that the relaying layer may perform no useful function. This requirement results in unnecessary lines of code required to relay communications and clutters compliant objects and requires unnecessary processing cycles. Thus, new systems and methods are needed to ameliorate the inherent inefficiencies associated with the current reference models.

SUMMARY OF THE INVENTION

The present invention is directed to an architecture system operable on a processor. The architecture system comprises a first architecture layer, a second architecture layer, and a transparent layer between the first architecture layer and the second architecture layer. The transparent layer enables the first architecture layer and the second architecture layer to communicate directly without having to communicate via the transparent layer.

Also, the present invention is directed to an architecture system operable on a processor. The architecture system comprises a plurality of architecture layer objects comprising at least a first layer object, a second layer object, and a transparent layer object. The transparent layer object is layered between the first layer object and the second layer object, and the transparent layer object is configured to be hidden for a communication between the first layer object and the second layer object. The first layer object and the second layer object are configured to relay the communication between each other by bypassing the transparent layer object.

Moreover, the present invention is directed to an architecture system operable on a processor. The system comprises an action province configured with logic to process an action and to generate at least one query requesting data. The system also comprises a yoke province configured to receive the query from the action province, to dynamically identify a database with a database type to which the query corresponds, to initiate a connection with the database to transmit the query to the database, to retrieve data in response to the query, and to transmit the data to the action province. The system further comprises a witness province configured to identify the action occurring via an input/output interface and to notify with the action at least one member of a group consisting of the action province and the yoke province. At least one member of a group consisting of the witness province, the action province, and the yoke province comprises at least one transparent layer configured to enable communication with a surrounding layer without having to communicate via the transparent layer.

Further, the present invention is directed to an architecture system operable on a processor. The system comprises a collection layer configured to support a first set of objects that operate as a communication interface to receive first data and to render second data. An envoy layer is configured to support a second set of objects to receive the first data from the collection layer, to condition the first data to a first form receivable by a lower layer, to receive the second data, and to condition the second data to a second form receivable by the collection layer. A naturalization layer is configured to support a third set of objects to apply at least one member of a group consisting of style support, customization support, and language support to the first data or the second data. An UGLI layer is configured to support a fourth set of objects configured to apply logic to the first data or the second data and to direct transfers of the first data and the second data. A terminal layer is configured to support a fifth set of objects configured to portal the first data or the second data between the UGLI layer and at least one member of a group consisting of the collection layer, the envoy layer, and the naturalization layer.

A repository layer is configured to support a sixth set of objects configured to store the first data or the second data. An initiation layer is configured to support a seventh set of objects configured to initiate storage and retrieval of the first data or the second data to and from a persistent storage by identifying the persistent storage and generating a command for the persistent storage. An optimization layer is configured to support an eighth set of objects configured to format the command generated from the initiation layer to a database format required by the persistent storage. A nomadic layer is configured to support a ninth set of objects configured to make a connection to the persistent storage and to pass the formatted command to the persistent storage. At least one of the layers is configured as a transparent layer to enable communication between at least two of the other layers without having to communicate via the transparent layer.

Further still, the present invention is directed to an architecture system operable on a processor. The system comprises a collection layer object configured to operate as a communication interface to receive first data and to render second data. A naturalization layer object is configured to apply at least one member of a group consisting of style support, customization support, and language support to the first data or the second data. An envoy layer object is configured to receive the first data from the collection layer, to condition the first data to a first form receivable by the naturalization layer, to receive the second data, and to condition the second data to a second form receivable by the collection layer. An UGLI layer object is configured to apply logic to the first data or the second data and to direct transfers of the first data and the second data. A terminal layer object is configured to portal the first data or the second data between the UGLI layer and at least one member of a group consisting of the collection layer, the envoy layer, and the naturalization layer.

A repository layer object is configured to store the first data or the second data. An initiation layer object is configured to initiate storage and retrieval of the first data or second data to and from a persistent storage by identifying the persistent storage and generating a command for the persistent storage. An optimization layer object is configured to format the command generated from the initiation layer to a database format required by the persistent storage. A nomadic layer object is configured to make a connection to the persistent storage and to pass the formatted command to the persistent storage. At least one of the layer objects is configured as a transparent layer object to enable communication between at least two of the other layer objects without having to communicate via the transparent layer object.

DETAILED DESCRIPTION

The present invention supports dynamic performance application development and maintenance with the ability to collapse intermediary layers that are not functionally required, thereby retaining the advantages of a layered architecture without incurring the associated overhead. Additionally, the architecture supports multiple points of separation, facilitating a high degree of flexibility in interface development.

For example, an Oracle database may be queried, or data may be retrieved from a structured query language (SQL) database via a pass-through query, originating in a collector layer as referenced below. The architecture may have nine layers, seven of which are between the top, collection layer and the bottom layer, nomadic layer. Six of the seven layers between the collection layer and the optimization layer may be collapsed so that the query passes directly from the collector layer to the optimization layer. The optimization layer is just above the nomadic layer.

Also, multiple interface types may be interchanged dynamically. For example, a graphical user interface (GUI) may be attached either at the naturalization layer or at the terminal layer, a hand held device interface may attach at the envoy layer or the naturalization layer, or a voice interface may be attached at the envoy layer.

Additionally, different interface objects may be selected to enable collection of information. The present invention enables live development and maintenance of complex support applications with the ability to toggle on and off desired layers of the architecture as well as to dynamically select various interfaces.

Figure 1:
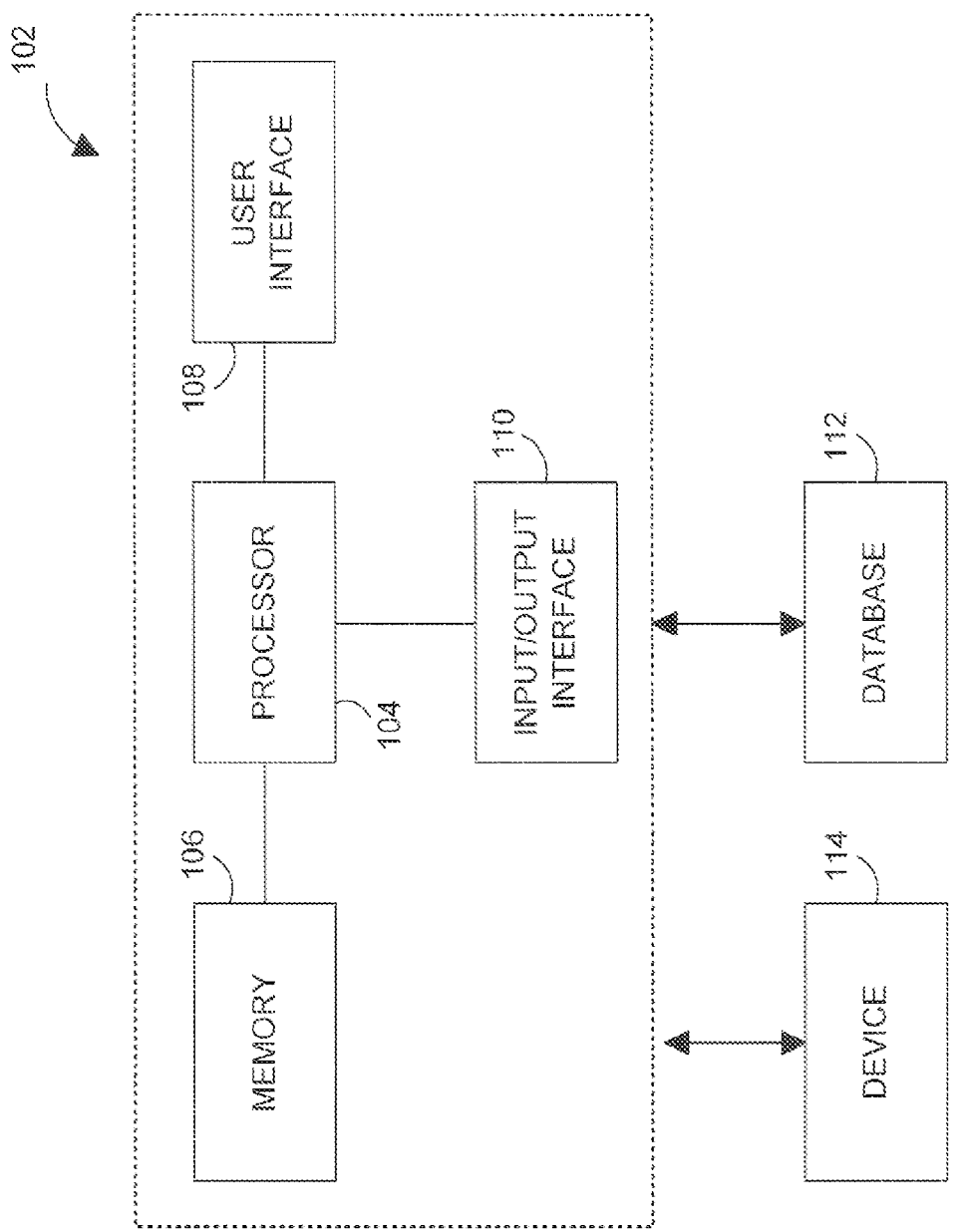
FIG. 1 is a block diagram of a computer system operating an architecture in accordance with an embodiment of the present invention.

FIG. 1 depicts an exemplary embodiment of a computer system operating an architecture of the present invention. The computer system 102 comprises a processor 104, a memory 106, a user interface 108, and an input/output interface 110. The computer system 102 may communicate with a database 112 and/or a device 114.

The processor 104 processes software and/or firmware to carry out operations for the computer system 102. The processor 104 may be configured to control transmitting communications, including data and messages, to and from the computer system 102 via the input/output (I/O) interface 110. The processor 104 also may be configured to control generating information to the user interface 108 and receiving information from the user interface. The processor 104 further may control transmitting data to the memory 106 for temporary, semi-permanent, and/or permanent storage and retrieving data from memory.

The memory 106 is configured to store data used by the processor 104 during operation and to provide access for that data to the processor. The memory 106 is configured to store data for temporary, semi-permanent, and/or permanent storage. Thus, the memory 106 may include volatile memory and/or non-volatile memory. Examples of such memory are random access memory (RAM), non-volatile RAM (NVRAM), read only memory (ROM), including programmable read only memory (PROM), erasable programmable read only memory (EPROM), and/or electrically erasable programmable read only memory (EEPROM). The memory 106 also may include flash memory or scratch memory.

The user interface 108 is configured to generate data to a user and/or receive data from a user. For example, the user interface 108 may be a graphical user interface (GUI), a web enabled interface, a voice activated interface, a voice recognition interface, a voice response interface, a simulated voice generation interface, an audio interface, a keyboard, a mouse, and other input and output devices. A GUI or web enabled interface may include interfaces generated to monitors for personal computers and other computers and interfaces generated for hand held devices, such as a palm pilot, a wireless phone, or another hand held unit. The user interface 108 also may include a video interface or an MP3 interface.

The I/O interface 110 communicates with the database 112 and other devices for which communication is required, such as the device 114. When communicating with the database 112, the I/O interface 110 opens a connection to the database. The I/O interface 110 may push or pull data to or from the database 112 or transmit or receive other communications, including messages and data, to the device 114. The I/O interface 110 may be configured to communicate with any database, including an SQL database, a DB2 database, via XML, an Oracle database, and others.

The I/O interface 110 may be configured to communicate using wireless and wireline communications. For example, the I/O interface 110 may be configured to communicate with the database 112 or the device 114 via a wide area network (WAN), a radio frequency (RF), a digital wireless network, a fiber link, a digital service level link, via an internet protocol (IP) connection, and other modes.

The database 112 is configured to store data. The database 112 may be, for example, an SQL database, an Oracle database, a DB2 database, and other database types.

The device 114 is a device configured to communicate with the computer system 102. The device 114 may be, for example, a personal computer, a server, a wireless based communication device, an IP device, a router, or another type of device configured to communicate with the computer system 102.

Figure 2:
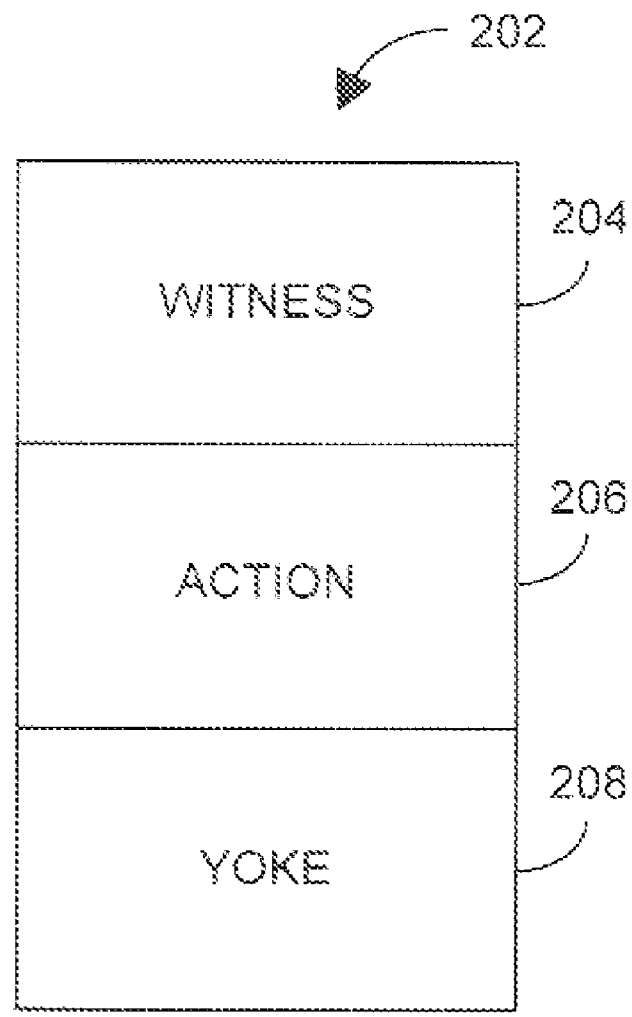
FIG. 2 is a block diagram of provinces for an architecture in accordance with an embodiment of the present invention.

FIG. 2 depicts an exemplary embodiment of an architecture of the present invention. The province architecture 202 comprises a witness province 204, an action province 206, and a yoke province 208. An application constructed according to the province architecture 202 may operate on the computer system 102.

The witness province 204 identifies actions that are occurring via the I/O interface 110 and generates a communication to the action province 206 and/or the yoke province 208 identifying those actions. The witness province 204 may change dynamically depending on the application created to operate on the computer system 102 and the actual configuration of the computer system. Thus, the witness province 204 may be dynamically changed to support a web enabled interface, a voice activation interface, or another interface. The witness province 204 has the ability to dynamically change for multiple interfaces while still retaining the ability to communicate with the action province 206.

The action province 206 provides the intelligence of the province architecture 202. The action province 206 comprises portals to and from the witness province 204 and the yoke province 208. Thus, the action province 206 may operate independently of the witness province 204 and/or the yoke province 208. This enables the witness province 204 and the yoke province to interchange with multiple architectures and with multiple interfaces to other applications. The action province 206 contains logic, business rules, algorithms, and/or other intelligence specific to each system (collectively, logic). Additionally, the action province 206 formats communications, such as queries and responses, for the witness province 204 and the yoke province 208, either to generate data or to request data.

The yoke province 208 initiates connections to databases and information. The yoke province 208 may be separable from the action province 206. Thus, the yoke province 208 may receive a query or other communication from the action province 206. The yoke province 208 then is responsible for making a connection to a specific database or other information repository and executing a query to obtain the information. The yoke province 208 may communicate with any database, including an Oracle database, a DB2 database, an SQL database, and other types of databases.

Figure 3:
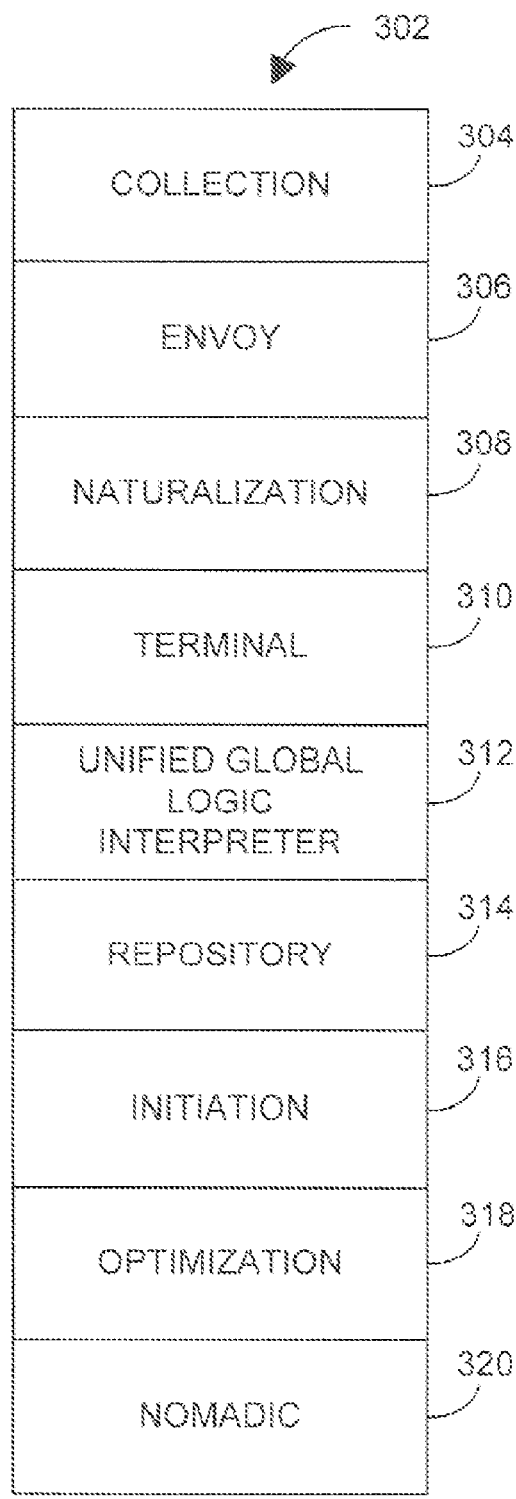
FIG. 3 is a block diagram of layers for an architecture in accordance with an embodiment of the present invention.

FIG. 3 depicts an exemplary embodiment of an architecture of the present invention. The layer architecture 302 comprises a collection layer 304, an envoy layer 306, a naturalization layer 308, a terminal layer 310, a unified global logic interpreter (UGLI) layer 312, a repository 314, an initiation layer 316, an optimization layer 318, and a nomadic layer 320.

The collection layer 304 supports objects that operate as the communication interface for the user interface 108. The collection layer 304 objects may transmit and receive communications to and from the user interface 108. The collection layer 304 may use any type of interface, such as a web enabled interface, another GUI interface, a byte stream listener, a voice recognition interface, a voice generation interface, an audio interface, and other interfaces.

The envoy layer 306 supports objects that condition communications for other layers, including data that may be passed between the collection layer 304 and the naturalization layer 308. For example, the envoy layer may condition data received from the collection layer 304, such as from a byte stream listener, so that the data may be received and processed by the naturalization layer 308. Conditioning refers to the process of conforming external data representations to data representations required by subordinate layers of the architecture. For example, an envoy layer object may convert voice recognition output, such as from a voice recognition collection layer object, to text that can be used by another layer object, such as the naturalization layer.

The naturalization layer 308 supports objects that apply style support for communications, including data, such as language support and customization support, so that the data may be used for a specific interface or for a lower layer. For example, the naturalization layer 308 objects may format data for English, Spanish, or German languages for language support. Also, the naturalization layer 308 may format data for a particular color for a style support. Alternately, the naturalization layer 308 may format data so that it may be received as a selected media for a customization support. Language support typically refers to a word or to a paring of words or phrases from English to another language, such as Spanish or German. Another more advanced instance of Language Support may refer to transliteration of words or phrases between English and another language, such as Spanish or German. Customization support typically refers to an object or to a word paring of signals or patterns of bytes to English words that are operative with the context of the system being developed.

The terminal layer 310 supports objects that operate as a functional portal to and from the upper three layers. The terminal layer 310 is the entrance to, and exit from, the application environment. The terminal layer 310 objects comprise the first layer of the action province 206, and they can be configured to pass communications, including data, to, and receive communications, including data, from, the naturalization layer 308 objects, which may be configured for multiple user interfaces. The terminal layer 310 objects may push and pull information to and from the naturalization layer 308 objects for varied interfaces. The terminal layer 310 typically may contain non-computational objects and methods that are designed with the intent to provide consolidation, entry, and exits points and unification of access to other architectural layers.

The UGLI layer 312 supports objects that apply complex logic, business rules, algorithms, and/or intelligence specific to a system (collectively, logic) to data. The UGLI layer 312 objects may process data according to logic for a system and control how data is obtained or transmitted. For example, the UGLI layer 312 objects may control generation of data to the terminal layer 310 objects for transfer of data to the naturalization layer 308 for transformation of user interface specific data from one format to another. Similarly, the UGLI layer 312 objects may control the directed transfer of data for a communication through the initiation layer 316 objects and the optimization layer 318 objects so that the data may be obtained by the nomadic layer 320 objects via a connection to an application specific database.

The repository 314 supports objects that store temporary and semi-permanent data used by an application. The repository 314 objects may include flash memory configured to store and pass data. The data may include live data stored for temporary use.

The initiation layer 316 supports objects that initiate storage and retrieval of data to and from persistent storage locations. For example, the initiation layer 316 objects may determine that an application requires data from a specified storage location, such as a specified database. The initiation layer 316 objects may then may generate and push commands that can be recognized and processed by that specific database. The initiation layer 316 identifies where the data is stored and generates commands for those databases in a form recognized by those databases for retrieval of the data. Similarly, the initiation layer 316 objects may identify where data can be stored for a particular application. The initiation layer 316 objects may then generate commands so the data may be stored in that location.

The optimization layer 318 supports objects that format the commands generated from the initiation layer 316 objects into the format required by the database to which the command will be transmitted. Common and popular database syntax systems may be stored in an encoded repository. Queries passing through this layer may contain a reference to the database type being queried, as well as a query string containing the originating query syntax. The query string then is analyzed and formatted specifically for the database being queried by referring to the syntax system for that database that is located in the repository.

For example, the optimization layer 318 objects may receive a command from the initiation layer 316 objects to retrieve data for a particular query. The initiation layer 316 objects may generate the command for the query. However, the optimization layer 318 objects may format the command for the query for a particular database. Thus, the optimization layer 316 objects may format a command so that it may be received and processed for the particular database, such as an SQL database or another database. The optimization layer 318 objects may be configured to format commands for varied databases, including an SQL database, an Oracle database, a DB2 database, XML based databases, DDL based databases, and other databases.

Similarly, the optimization layer 318 supports objects that format communications received from a particular database so that it may be further processed by the initiation layer 316 objects or other layer objects. For example, the optimization layer 318 objects may receive a command and data from a particular database. The optimization layer 318 objects may format the command and the data so that both the command and the data may be passed to, and processed by, upper layers.

The nomadic layer 320 supports objects that make connections to various databases based upon requirements from upper layers. The nomadic layer 320 will receive the formatted command from the optimization layer 318 objects. Based upon the formatted command, the nomadic layer 320 objects may make a connection to a specified database. The nomadic layer 320 objects may transmit the formatted command to the specified database for execution of the command. Similarly, the nomadic layer 320 receives commands and data back from the database and passes the commands and data to the optimization layer 318 objects for further processing, storage, and/or execution. The nomadic layer 320 objects may be configured to connect to any type of database, including an SQL database, an Oracle database, a DB2 database, and XML based database, and DDL based database, and other databases. A repository database may be configured to store the information required to establish a connection to, and execute transactions on, a particular database. In one embodiment, the same repository that stores the database syntax systems for various databases also stores the information required to establish a connection to, and execute transactions on, a particular database. This repository database may be provided by an application developer for each application.

In one embodiment, the collection layer 304, the envoy layer 306, and the naturalization layer 308 are within a witness province 204. The terminal layer 310, the UGLI layer 312, the repository 314, the initiation layer 316, and the optimization layer 318 are within the action province 206. The nomadic layer 320 is within the yoke province 208.

The structure of the layer architecture 302 enables an application to communicate via any user interface 108 and communication to any type of database 112. The witness province 204 and the yoke province 208 may be stripped from the action province 206. Thus, the core application may be developed using the required logic for the action province 206, and the layers 304–308 for the witness province 204 may be dynamically changed or implemented to communicate via varied user interfaces. Similarly, the nomadic layer 320 of the yoke province 208 may be stripped from the layers 310–318 of the action province 206 enabling the application to communicate with multiple varied databases while retaining the core logic.

Moreover, an application may be generated so that it uses the layers 304–308 of the witness province 204 multiple times with multiple user interfaces. Thus, an application may be configured to simultaneously use a web enabled interface, a byte listener, and a voice recognition interface. Because all communications may travel from the naturalization layer 308 objects of the varied user interfaces to the terminal layer 310 objects of the core application, data and communications can communicate and go through actions easily and be formatted easily for required style, customization, and language support while also being processed by the UGLI layer 312.

It will be appreciated that the terminal layer 310 objects may have multiple portals to and from multiple naturalization layers 308 for a single application. Alternately, the terminal layer 310 objects for an application may have a single portal to the naturalization layer 308 of the user interface, but may be moved to another portal if needed. The terminal layer 310 objects may be moved, for example, if the context or environment of the application may change. For example, an application originally developed for the Web, may be extended to a standalone PC version, requiring moving the terminal layer 310 objects.

Also, the nomadic layer 320 objects may generate one or more connections to one or more databases depending on the needs of the layers 310–318 of the action province 206. For a single application, the nomadic layer 320 objects may connect to one or more databases. Thus, the application is not tied to any particular database language. The commands for a specified database are customized based on each instance of the type of database and the connection needed. This customization of the commands occurs in the optimization layer 318 objects for any required database, and the connection is made in the nomadic layer 320 objects. Thus, any language to any database may be coded, and the nomadic layer 320 objects may parse the code or command to make a connection to the required database. This also enables a single application to communicate easily with multiple types of databases.

In one embodiment, the layers 304–320 are an arrangement of system objects designed to support an application. The structure of the objects for object oriented programming systems enhances the ability of the layer architecture 302 or the province architecture 202 to communicate using varied user interfaces and to communicate with varied databases. For example, one or more objects may be implemented for the collection layer 304, the envoy layer 306, and the naturalization layer 308 for a particular user interface. A different set of objects may be implemented for a different collection layer 304, a different envoy layer 306, and a different naturalization layer 308 for a different user interface. Those sets of objects may communicate with the same terminal layer 310 for an application.

Similarly, a first object may be implemented for a nomadic layer 320 for an application. However, although another object may be created for another nomadic layer 320, it is not needed. A single object for a single nomadic layer 320 may operate to communicate with multiple databases of this architecture. Only a core set of objects need be created for the terminal layer 310, the UGLI layer 312, the repository 314, the initiation layer 316, and the optimization layer 318. Those core sets of objects can communicate with the varied objects for the varied user interfaces and the one or more objects for the nomadic layer 320.

The province architecture 202 and/or the layer architecture 302 may include a transparent layer. The transparent layer enables the layer architecture 302 to skip from a first layer to a third layer without going through a second layer. The second layer can collapse and be invisible for a specified communication, including a message or data. Alternately, the transparent layer can be configured to not be invisible for other communications, such as other messages or other data. Functional methods or specified objects or classes of objects may be grouped so that a particular layer is configured as a transparent layer for those methods, objects, or classes of objects. The concept of a transparent layer for an N-tier layer architecture is unknown. Typically, data or communications must go through each layer to get to the next layer.

The architectures 202 and 302 themselves represent an agreement, or protocol that directs how software will be developed. A transparent, hidden layer, represents an agreement that, for the method or methods affected, the specified layers will be transparent, or hidden. The capacity to make that agreement is unique.

The transparent layer may have one or more associated surrounding layers. The surrounding layers are the layers between which a communication will be passed by bypassing the transparent layer. For example, if the envoy layer 306 of FIG. 3 is the transparent layer, then the collection layer 304 and the naturalization layer 308 are the surrounding layers. As another example, if the envoy layer 306 and the naturalization layer 308 both are transparent layers, then the collection layer 304 and the terminal layer 310 are the surrounding layers.

For example, the optimization layer 318 may be defined as a transparent layer. In this example, a command may be transmitted from the initiation layer 316 to the nomadic layer 320 without passing through the optimization layer 318. The transparent layer may enable applications to save processing time by not requiring a command or data to pass through a particular layer, thereby eliminating some processing of that command or data.

Those skilled in the art will appreciate that variations from the specific embodiments disclosed above are contemplated by the invention. The invention should not be restricted to the above embodiments, but should be measured by the following claims.

What is claimed is:

1. An architecture system operable on a processor comprising:
   an action province comprising:
     an UGLI layer object configured to apply logic to an action and to direct transfers of the action and at least one query requesting data;
     a repository layer object configured to store the data;
     an initiation layer object configured to initiate storage and retrieval of the data to and from a database by identifying the database and generating the query for the database; and
     an optimization layer object configured to format the query in a format required by the database;
   a yoke province configured to receive the query from the action province, to dynamically identify the database with a database type to which the query corresponds, to initiate a connection with the database to transmit the query to the database, to retrieve data in response to the query, and to transmit the data to the action province; and
   a witness province configured to identify the action occurring via an input/output interface, to notify with the action at least one member of a group consisting of the action province and the yoke province, and to dynamically support a plurality of user interfaces, each having a different interface type;
   wherein at least one of the different interface types comprises a member of a group consisting of a graphical user interface, a web enabled interface, a handled device interface, a voice simulation interface, a voice response interface, a voice activated interface, a voice recognition interface, and an audio interface; and
   wherein at least one member of a group consisting of the witness province, the action province, and the yoke province comprises at least one transparent layer configured to enable communication with a surrounding layer without having to communicate via the transparent layer.

2. An architecture system operable on a processor comprising:
   an action province configured with logic to process an action and to generate at least one query requesting data;
   a yoke province configured to receive the query from the action province, to dynamically identify a database with a database type to which the query corresponds, to initiate a connection with the database to transmit the query to the database, to retrieve data in response to the query, and to transmit the data to the action province; and
   a witness province configured to identify the action occurring via an input/output interface, to notify with the action at least one member of a group consisting of the action province and the yoke province, and to dynamically support a plurality of user interfaces, each having a different interface type, the witness province comprising:

a collection layer object configured to operate as a communication interface to receive the action and to render second data;

an envoy later object configured to receive the action from the collection layer, to condition the action to a first form receivable by a lower layer, to receive the second data, and to condition the second data to a second form receivable by the collection layer;

a naturalization layer object configured to apply at least one member of a group consisting of style support, customized support, and language support to the action or the second data and to transmit the second data to the envoy layer object; and a terminal layer object configured to portal the action or the second data between the action province and at least on member of a group consisting of the collection layer, the envoy layer, and the naturalization layer;

wherein at least one of the different interface types comprise a member of a group consisting of a graphical user interface, a web enabled interface, a handled device interface, a voice simulation interface, a voice response interface, a voice activated interface, a voice recognition interface, and an audio interface;

wherein at least one member of a group consisting of the witness province, the action province, and the yoke province comprise at least one transparent layer configured to enable communication with a surrounding layer without having to communicate via the transparent layer.

3. An architecture system operable on a processor comprising:

a collection layer configured to support a first set of objects that operate as a communication interface to receive first data and to render second data;

an envoy layer configured to support a second set of objects to receive the first data from the collection layer, to condition the first data to a first form receivable by a lower layer, to receive the second data, and to condition the second data to a second form receivable by the collection layer;

a naturalization layer configured to support a third set of objects to apply at least one member of a group consisting of style support, customization support, and language support to the first data or the second data;

an UGLI layer configured to support a fourth set of objects configured to apply logic to the first data or the second data;

a terminal layer configured to support a fifth set of objects configured to portal the first data or the second data between the UGLI layer and at least one member of a group consisting of the collection layer, the envoy layer, and the naturalization layer;

a repository layer configured to support a sixth set of objects configured to store the first data or the second data;

an initiation layer configured to support a seventh set of objects configured to initiate storage and retrieval of the first data or the second data to and from a persistent storage by identifying the persistent storage and generating a command for the persistent storage;

an optimization layer configured to support an eighth set of objects configured to format the command generated from the initiation layer to a database format required by the persistent storage; and a nomadic layer configured to support a ninth set of objects configured to make a connection to the persistent storage and to pass the formatted command to the persistent storage;

wherein at least one of the layers is configured as a transparent layer to enable communication between at least two of the other layers without having to communicate via the transparent layer.

4. The system of claim 3 wherein the communication interface comprises at least one member of a group consisting of a graphical user interface, a web enabled interface, a handled device interface, a voice simulation interface, a voice response interface, a voice activated interface, a voice recognition interface, and an audio interface.

5. The system of claim 3 wherein the optimization layer eighth set of objects further is configured to format other data received from the persistent storage to another format receivable by the initiation layer.

6. The system of claim 3 wherein the nomadic layer ninth set of objects further is configured to receive other data in response to the formatted command and to pass the other data to the optimization layer.

7. The system of claim 3 wherein the persistent storage comprises at least one member of a group consisting of a structure query language database, an Oracle database, a DB2 database, and an XML-based database.

8. An architecture system operable on a processor comprising:

a collection layer object configured to operate as a communication interface to receive first data and to render second data;

a naturalization layer object configured to apply at least one member of a group consisting of style support, customization support, and language support to the first data or the second data;

an envoy layer object configured to receive the first data from the collection layer object, to condition the first data to a first form receivable by the naturalization layer object, to receive the second data, and to condition the second data to a second form receivable by the collection layer object;

an UGLI layer object configured to apply logic to the first data or the second data and to direct transfers of the first data and the second data;

a terminal layer object configured to portal the first data or the second data between the UGLI layer object and at least one member of a group consisting of the collection layer object, the envoy layer object, and the naturalization layer object;

a repository layer object configured to store the first data or the second data;

an initiation layer object configured to initiate storage and retrieval of the first data or the second data to and from a persistent storage by identifying the persistent storage and generating a command for the persistent storage;

an optimization layer object configured to format the command generated from the initiation layer object to a database format required by the persistent storage; and a nomadic layer object configured top make a connection to the persistent storage and to pass the formatted command to the persistent storage;

wherein at least one of the layers is configured as a transparent layer object to enable communication between at least two of the other layer objects without having to communicate via the transparent layer object.

* * * * *

UNITED STATES PATENT AND TRADEMARK OFFICE
CERTIFICATE OF CORRECTION

PATENT NO.         : 7,228,548 B1
APPLICATION NO.    : 10/017850
DATED              : June 5, 2007
INVENTOR(S)        : Daniel J. Aldrich et al.

Page 1 of 1

It is certified that error appears in the above-identified patent and that said Letters Patent is hereby corrected as shown below:

Column 10, line 40; column 11, line 21; and column 12, line 8: replace the word "handled" with --handheld--

Column 11, line 11: replace the word "customized" with --customization--

Column 11, line 47: after "second data" add text --and to direct transfers of the first data and the second data;--

Column 12, line 59: replace the word "top" with --to--

Signed and Sealed this

First Day of September, 2009

David J. Kappos
*Director of the United States Patent and Trademark Office*